Nov. 29, 1966  T. W. KENYON  3,287,968
BOAT SPEEDOMETER

Filed March 24, 1964  2 Sheets-Sheet 1

INVENTOR.
THEODORE W. KENYON
BY
Davis, Hoxie, Faithfull & Hapgood
ATTORNEYS.

INVENTOR.
THEODORE W. KENYON
BY
Davis, Hoxie, Faithfull & Hapgood
ATTORNEYS.

United States Patent Office 3,287,968
Patented Nov. 29, 1966

3,287,968
BOAT SPEEDOMETER
Theodore W. Kenyon, Joshua Town Road,
Old Lyme, Conn.
Filed Mar. 24, 1964, Ser. No. 354,392
8 Claims. (Cl. 73—186)

This invention relates to instruments designed to provide instantaneous indications of the speed of boats, although it is contemplated that essentially the same organization may be used for other purposes.

There are a variety of instruments presently available for the present purpose, among these being the boat speedometer disclosed in my expired Patent No. 1,955,502. All such instruments generally have a mechanical structure mounted so as to extend outwardly from the hull of a boat, which structure reacts to the flow of the water past it. The reaction of the mechanical structure is then converted in various ways to provide a direct reading of speed on a meter in the cockpit of the boat. These instruments, while found to be adequate for many purposes, have certain distinct disadvantages which the present invention is designed to correct. The meter indication of speed in such instruments is usually in the form of a logarithmic curve, with the result that lower indications of speed on the instrument meter are very closely spaced and difficult to accurately differentiate. Also, certain forms of present instruments function by variable hydraulic pressure means, which means are subject to temperature variations. In addition, the pressure transmitting means to the meter are expensive and subject to hydrostatic pressure variations which produce inaccurate instrument readings. All forms of presently known instruments that I am aware of function by various moving parts which encounter unavoidable friction in their operation. This friction may be particularly disadvantageous at very low boat speeds where the water flow is not sufficient when reacting with the submerged sensing structure of the instrument to overcome the friction. It is extremely critical in racing sailboats, for example, that low boat speeds be accurately measured, since the changing of various sails and their trim will thereby be determined. Small speed changes at all ranges should in fact be accurately and instantly sensed in such boats, and friction between instrument parts prevents this. Finally, certain forms of present instruments produce inaccurate results due to shifting null points and vibration in the submerged sensing structure being transmitted to the instrument meter.

It is the primary object of the present invention to provide an improved boat speedometer which provides speed readings of exceptionally high accuracy at all speed ranges from zero knots upwards, thereby overcoming the above deficiencies in the prior art.

The present invention includes a strut angularly extending from the boat hull and exposed to the water flow past the hull in the manner of my prior Patent No. 1,955,502. This flow of the water, when the boat is underway, tends to deflect the strut backwardly, but contrary to my prior patent, the strut is affixed to a torsion bar fixed in place at its ends within a hull-mounted casing. The use of the torsion bar eliminates the friction found to plague present instruments. A transformer is provided within the casing which has two secondary windings opposingly connected in series and a primary winding fed from an oscillator located with the other components of the speedometer electornics system in the boat cockpit. The magnetic path between the primary winding and one secondary winding has a constant air gap, and the magnetic path between the primary and the other secondary winding has an air gap that is varied from a value equal to the constant air gap according to the deflection of the strut. The voltage signal from the series of two opposingly connected secondary windings is relayed to an amplifier, rectifier, and finally to the meter in the boat cockpit. This signal is virtually in direct proportion to the speed of the boat by virtue of the relationships between speed, air gap and force exerted on the strut, and an essentially linear meter speed indication is thereby achieved. Damping means are provided to operate with the torsion bar to prevent the meter from responding to vibrations encountered by the strut. Temperature compensating means are provided for the electrical circuitry, and novel unbalancing and biasing means are provided for said circuitry to circumvent flux and harmonic effects from the series of secondary windings at low output voltages. An exceptionally accurate indication of boat speed in power and sail boats is thereby achieved for all ranges.

Other objects and the full nature of the invention will be readily understood and appreciated from the following detailed description, taken in conjunction with the accompanying drawings wherein one embodiment of the invention is illustrated by way of example.

Figures 1, 2:
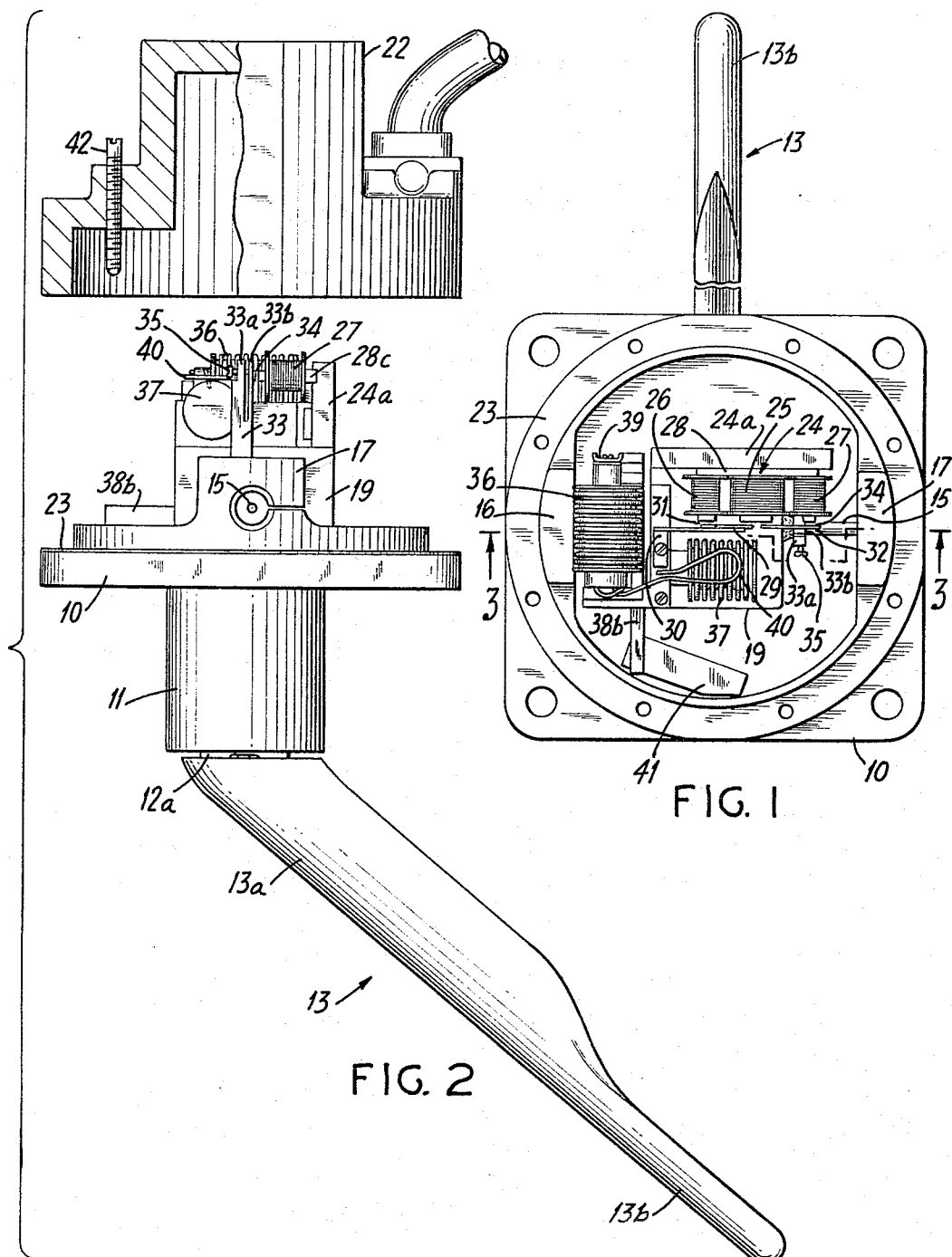
FIGURE 1 is an overhead plan view of the hull-mounted structure of the speedometer, with the enclosure cap removed to expose the interior.
FIGURE 2 is a side elevational view of the hull-mounted structure of the speedometer, with the enclosure cap lifted away to expose the interior.
Figure 3:
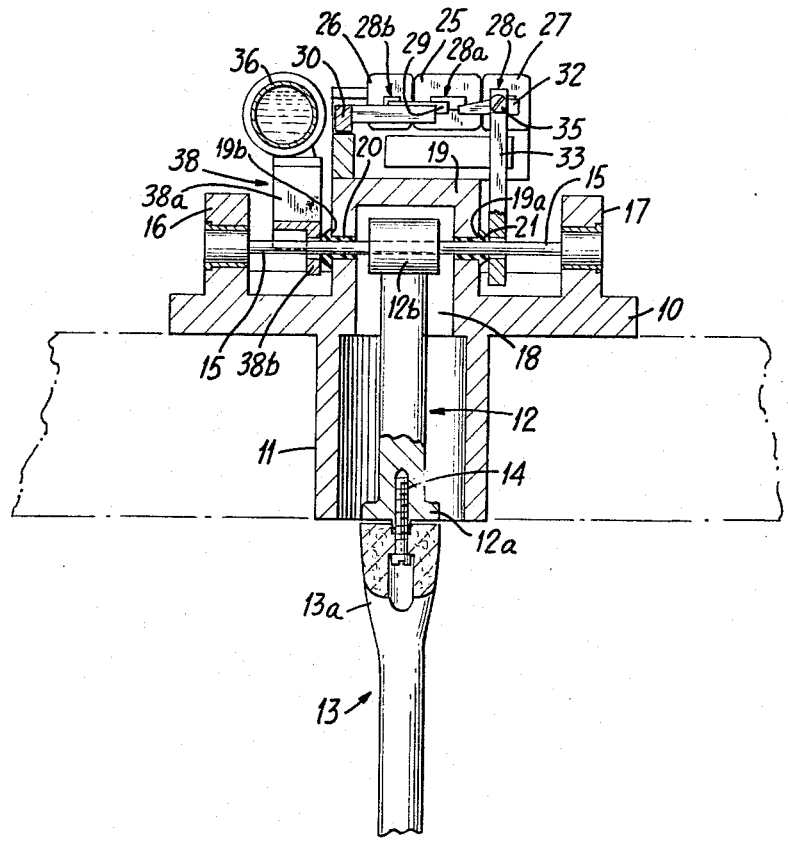
FIGURE 3 is a vertical cross-sectional view taken along lines 3—3 of FIGURE 1, illustrating the mounting of the sensing strut of the speedometer.

Referring to FIGURES 1, 2 and 3, reference numeral 10 designates a platform which may be mounted to the inside of the midsection of a boat hull. Bronze is an excellent material for said platform and its accompanying structure. A tubular section 11, surrounding a linkage 12, is a portion of and extends outwardly from platform 10 through a hole cut in the hull corresponding in size to section 11, and the bottom of section 11 will generally be flush with the outside surface of the boat hull. Lightweight strut 13 is attached by breakaway screw 14 to the bottom end 12a of upwardly extending linkage 12, and extends aft from the bottom of the boat into the flow of water past the boat hull. Screw 14 is of sufficient strength to provide an operative connection between linkage 12 and strut 13 under all normal conditions, but is engineered to snap when strut 13 encounters shoals or heavy debris; this safety feature prevents extraordinary forces on strut 13 from damaging the boat hull. Under normal operating conditions, linkage 12 may be considered an extension of strut 13.

Strut 13 extends aft at an angle of approximately fifty degrees to a plane perpendicular to the boat hull, since seaweed and other water plants are found to slide off strut 13 at such an angle without catching or fouling to provide erroneous speed readings. This angle is not critical, depending upon the condition of the water being navigated. Strut 13 in its upper portion 13a is streamlined in shape so as not to be deflected by drag forces due to the layer of water directly adjacent the boat hull. This layer of water is partially carried along by the boat hull, and would produce inaccurate speed readings; strut 13 is therefore designed so that only the portion 13b extending below said layer interacts with the water flow to produce speed readings. Lower portion 13b is essentially cylindrical to create the drag force on strut 13, which of course is proportional to the speed of the boat squared. Strut portion 13a in fact has been found to only carry about 2% of the force exerted on strut 13, due to its streamlined shape.

The upper end 12b of linkage 12 is affixed to the midpoint of torsion bar 15, and the two ends of said bar are rigidly held against rotative motion by being clamped within projections 16 and 17 rising from platform 10. When the boat is under way, strut 13 is deflected according to the speed of the boat and acts through linkage 12 to twist torsion bar 15. Since the ends of said bar do not rotate, the operation of the bar is not subject to friction forces and may therefore sense very small changes in the speed of the boat causing deflection of strut 13 and linkage 12. No presently known device can provide such sensitivity, which is of great advantage in trimming and controlling sails in racing boats. The midsection of torsion bar 15, where linkage 12 is affixed, passes through chamber 18 enclosed and defined by raised portion 19 of platform 10. Water may be sucked into tubular section 11 and chamber 18 when the boat is underway, and the water must not pass into the space above platform 10 where structure to be discussed below is mounted. Silicon rubber sealers 20 and 21 are therefore cast in place around torsion bar 15 at the two points 19a and 19b where said bar passes into and out of chamber 18. In certain forms of present devices, having a rotatable bar in place of torsion bar 15, rubber sealers are pressed in at points 19a and 19b and are therefore under tension and compression forces from the method of insertion. These tension and compression forces within the sealers have been found to cause the rotatable bar to shift and creep from its null point and produce inaccurate speed readings unless constant readjustment is carried out. By casting sealers 20 and 21 in place, however, they are free of internal forces and do not act on torsion bar 15 to disturb its null position. Additionally, this casting in place of the sealers about bar 15 results in negligible friction between said bar and said sealers. All of the structure mounted on platform 10 is further sealed by removable cap 22, with ring seal 23 cooperating with said cap when in place to define a watertight space between the two elements. Cap 22, which extends within the boat hull, may be removed when the boat is underway to carry out any necessary repairs.

Transformer 24 is attached to a non-magnetic vertical plate 24a mounted on the top surface of chamber 18 and has primary winding 25 and secondary windings 26 and 27 wound on an E-shaped magnetic core 28. Magnetic metal bar 29 completes the magnetic circuit for winding 25 and 26, and is fixed in position by attached non-magnetic vertical projection 30 mounted on chamber 18. A constant air gap 31 is thereby maintained between bar 19 and the two sections of the E-shaped core 28a and 28b. Magnetic metal bar 32 completes the magnetic circuit for windings 25 and 27, and is mounted on non-magnetic projection 33 integrally affixed to torsion bar 15 between chamber 18 and projection 17. Projection 33 is set so that magnetic bar 32 defines an air gap 34 with the two sections of the E-shaped core 28a and 28c equal to air gap 31 when the boat is initially at rest and no force is exerted on strut 13; when the boat is underway, the force on strut 13 acts through linkage 12 to twist torsion bar 15, and projection 33 is rotated according to the twist of said bar to change air gap 34 in an amount directly proportional to the force on strut 13. Secondary windings 26 and 27 are connected together in series opposition, and when a constant voltage is supplied to primary winding 25, the output voltage from the series of secondary windings 26 and 27 will vary according to square root of the amount that air gap 34 increases from a value initially equal to air gap 31. Since the force on strut 13 is proportional to the speed of the boat squared, and air gap 34 changes proportionally with the force on strut 13, said output voltage should be directly proportional to the speed of the boat. In fact, due to flux fringing around transformer 24, this output voltage may vary a few percent from being in direct proportion to said speed at all boat speeds above a certain minimal level, such as approximately one knot on a meter scale that would be calibrated for use in a sail boat. Below this minimal level flux fringing may be more serious, but in a sail boat, for example, speeds below one knot are not critical since the boat is essentially drifting and changing and trimming of sails will be of no advantage. Above this minimal level, the variation from direct proportionality between output voltage and speed still results in what is essentially linear measurement of speed being provided on the instrument meter after said output voltage is amplified and demodulated. This is in direct contrast to logarithmic meter indications which are severely compressed together in the initial 40 or 50 percent of the meter scale (4 or 5 knots in sailboats) where meter readings may be most critical, and overly expanded in the upper ranges of the meter scale where meter readings are least critical. Projection 33 is split from the top along a short portion of its length into two sections 33a and 33b, and adjusting screw 35 passing through section 33a and bearing against section 33b can be utilized for fine adjustments of air gap 34 after projection 33 is affixed to torsion bar 15. Windings variations, for example may necessitate such fine adjustment.

Bellows 36 and 37 perform damping for the speedometer, preventing mechanical oscillations in the instrument and preventing the vibration and flutter of strut 13 from being transferred to the meter as an indication of speed change. L-shaped member 38 is affixed to torsion bar 15 at the horizontal portion of the L to rotate therewith, and a stiff section 39 of spring steel is attached only to the lower end of section 38a of member 38. The upper end of section 39 is attached to one end of bellows 36, with the other end of said bellows being fixed in position to vertical projection 30 mounted on chamber 18. Narrow tubing 40 connects bellows 36 to one end of bellows 37 which is also fixed in position to vertical projection 30. The opposite end of bellows 37 is free to expand and contract. Bellows 36 and 37 are initially completely filled with fluid, and when movement in strut 13 twists torsion bar 15, section 38a and spring section 39 move together to contract bellows 36 and force more fluid into expandable bellows 37. Both bellows 36 and 37 must initially be filled, since air sources in said damping system will provide variable damping and therefore inaccurate meter indications. The resistant fluid flow through narrow tubing 40 provides the damping. When strut 13 and torsion bar 15 later return to their zero speed positions, bellows 36 expands and draws fluid from bellows 37 back into it through tubing 40. Bellows 37 returns to its normal position, still filled with fluid. If strut 13 is subjected to sudden shocks rather than normal speed changes, stiff spring 39 will not move together with section 38a; rather, said spring will bend and therefore act as a safety cushion to prevent sudden twists in torsion bar 15 from rupturing bellows 36. Section 38b of member 38 has extension 41 affixed to its end, and adjusting screw 42 extending through cap 22 bears on said extension. Adjusting of said screw serves to set the scale of the meter after cap 22 is in place, by twisting torsion bar 15 and thereby varying air gap 34.

Figure 4:
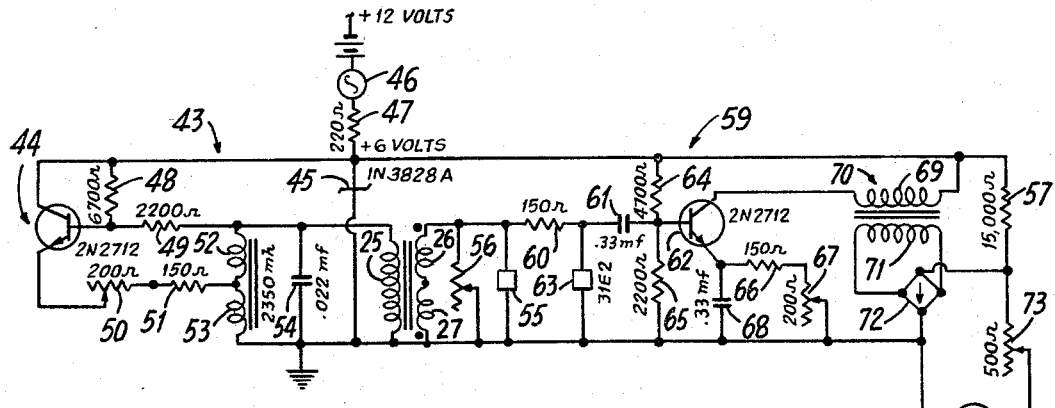
FIGURE 4 is a schematic view of the electrical circuitry of the speedometer.

Referring to FIGURE 4, illustrating the electrical circuitry of the speedometer, oscillator 43 derives a 4000 c.p.s. signal from silicon transistor 44. The direct current supply to said oscillator is regulated at six volts by Zener diode 45, with the twelve volt supply being fused at 46 and dropped through resistance 47. Resistance 48 and 49 provide the base bias for transistor 44, and resistances 50 and 51 develop the emitter signal of said transistor. Inductances 52, 53 and capacitance 54 provide the frequency determining tank circuit for oscillator 43 and the oscillator output signal is placed across primary winding 25 connected across capacitance 54. Resistance 50 is adjustable so that said output signal is maintained at five volts.

As mentioned above, secondary windings 26 and 27 of transformer 24 are connected together in series opposition. Alternatively, secondary winding 26, having a constant voltage induced therein due to air gap 31 remaining constant, may be replaced by any constant voltage source; the use of winding 26 to provide a constant voltage is preferred, however, since there are no output phase shift problems between windings 26 and 27. Thermistor 55 is connected across said series to provide temperature compensation for said windings and adjustable trimmer resistance 56 is also connected across said series to provide compensation for dimensional variations in said windings. At zero boat speed, if secondary windings 26 and 27 were exactly balanced, their connection in opposition would result in zero output voltage across the series, since air gaps 31 and 34 would be equal. This result is unattainable, however, since windings 26 and 27 and the waveshapes they produce cannot be perfectly balanced to achieve zero output voltage. In addition, unpredictable harmonic signals and flux fringing in fact give non-linear and inaccurate speed indications for approximately the lower ten percent of the boat speed range. The solution to this problem of accurately measuring low boat speeds is to purposely unbalance windings 26 and 27 by changing air gap 34 so that said series of windings gives a positive output signal for zero boat speed equal to that signal which would indicate approximately ten percent of the boat speed range, were windings 26 and 27 perfectly balanced. This output voltage, of the order of four and one-half millivolts for the embodiment shown, is then corrected by the drop from the 6 volt voltage supply through biasing resistance 57 so that meter 58 actually reads zero at zero boat speed. In this manner, the faulty portion of the output signal from the series of secondary windings 26 and 27 is largely eliminated, and essentially linear speed indications are achieved that are exceptionally accurate for all speed ranges.

The output signal from the series of secondary windings 26 and 27 is coupled to amplifier 59 through resistance 60 and capacitance 61 to the base of silicon transistor 62. Since amplifier 59, as well as the rest of the electrical circuitry except transformer 24, is situated in the often hot cockpit of the boat, varistor 63 is provided for temperature sensitive compensation. Resistances 64 and 65 bias the base of transistor 62, and resistances 66 and 67, bypassed by the capacitance 68, develop the emitter signal of transistor 62. Resistance 67 is adjustable so that the full-scale output voltage from the series of secondary windings may be established at twenty-five millivolts. The collector of transistor 62 is connected to primary winding 69 of output transformer 70, and secondary winding 71 of transformer 70 is connected to a conventional bridge rectifier 72. The demodulated signal from rectifier 72 is then placed across the series connection of meter 58 and adjustable resistance 73. The signal delivered to rectifier 72 is of the order of four-tenths of a volt for zero boat speed and one volt for full scale speed. These speed signals, as mentioned above, are corrected for by resistance 57 biasing meter 58 below zero, so that meter 58 always indicates the exact speed of the boat. Resistance 73 is a dial calibration resistance to adjust for the fact that the flow of water past different boats may vary up to ten percent as hull configurations and the mounting positions of strut 13 on the hull vary. Time and distance are calibrated over a known course, and resistance 73 is accordingly adjusted.

While I have herein shown and described a preferred embodiment of my invention, it will be understood that the invention may be embodied in a considerable variety of forms without departing from the spirit and scope thereof.

I claim:

1. In a boat speedometer, the combination of a strut adapted to project into the water; a platform superstructure; a torsion bar on which said strut is secured, said bar having its ends mounted to said platform; a transformer attached to said platform having a primary winding and a secondary winding; a projection attached to said torsion bar, defining an air gap in the flux path between said primary and secondary windings, said air gap varying in direct proportion to the force on the strut; a first voltage source connected to said primary winding; a second voltage source connected in series opposition with said secondary winding; said series connected circuit providing a voltage output varying, as said air gap varies, in essentially direct proportion to the speed of the boat; a meter graduated in an essentially linear manner for speed; and, circuit means for transmitting said voltage output to said meter.

2. The invention defined in claim 1, wherein said transmitting circuit means includes amplifying and rectifying means.

3. The invention defined in claim 1, wherein the portion of said projecting strut nearest the boat hull is streamlined, and the remaining lower portion of said strut is configured to carry substantially all of the force exerted on said strut by water flow.

4. The invention defined in claim 1, having in addition, hydraulic damping means cooperating with said torsion bar to dampen the motion of said strut.

5. The invention as defined in claim 1, wherein said series connected circuit is unbalanced to provide an output voltage at zero boat speed, and said means for transmitting said voltage output to said meter includes biasing means to compensate for said zero speed output voltage, whereby said meter indicates zero at zero boat speed.

6. The invention as defined in claim 1, wherein said second voltage source is a second secondary winding of said transformer, having a constant air gap in the flux path with said primary winding.

7. The invention defined in claim 6, wherein the air gaps of both said secondary windings are equal at zero boat speed.

8. In a boat speedometer, the combination of a strut adapted to project into the water; a platform for supporting said strut, said platform having a chamber to receive one end of said strut; a torsion bar on which said strut is secured, said bar extending through the walls of said chamber; means securing the ends of said bar against movement; water-sealing means cast in place about said torsion bar where it passes through the walls of said chamber, to prevent leakage of water from said chamber while still permitting free movement of said torsion bar; a transformer attached to said platform having a primary winding and a secondary winding; a first voltage source connected to said primary winding; a projection attached to said torsion bar defining an air gap in the flux path between said primary and secondary windings, said air gap varying with the motion of said strut and said torsion bar; a second voltage source connected in series opposition with said secondary winding; said series connected circuit providing a voltage output varying, as said air gap varies, in essentially direct proportion to the speed of the boat; a meter graduated in an essentially linear manner for speed; and means for transmitting said voltage output to said meter.

References Cited by the Examiner

UNITED STATES PATENTS

| | | | |
|---|---|---|---|
| 1,955,502 | 4/1934 | Kenyon | 73—182 |
| 2,312,579 | 3/1943 | O'Brien | 277—1 |
| 3,805,574 | 9/1957 | Jackson et al. | 73—228 |
| 3,150,526 | 9/1964 | Strimel | 73—411 |
| 3,211,004 | 10/1965 | Spencer | 73—398 |

LOUIS R. PRINCE, *Primary Examiner.*

D. O. WOODIEL, *Assistant Examiner.*